US007797795B2

(12) United States Patent
Maatta et al.

(10) Patent No.: US 7,797,795 B2
(45) Date of Patent: Sep. 21, 2010

(54) HINGE STRUCTURE FOR AN ELECTRONIC DEVICE

(75) Inventors: Esa Maatta, Viiala (FI); Jussi Hakunti, Turku (FI); Tomas Ivaskevicius, Helsinki (FI)

(73) Assignee: Nokia Corporation, Espoo (FI)

( * ) Notice: Subject to any disclaimer, the term of this patent is extended or adjusted under 35 U.S.C. 154(b) by 815 days.

(21) Appl. No.: 11/433,082

(22) Filed: May 12, 2006

(65) Prior Publication Data
US 2006/0278234 A1 Dec. 14, 2006

(30) Foreign Application Priority Data
May 13, 2005 (FI) ................................. 20055225

(51) Int. Cl.
*E05D 11/00* (2006.01)
(52) U.S. Cl. ................. 16/250; 455/575.3; 379/433.13; 16/358
(58) Field of Classification Search ............... 16/358, 16/250, 380; 455/575.3; 361/381, 679.27; 248/917, 919, 922; 174/66; 379/433.13
See application file for complete search history.

(56) References Cited
U.S. PATENT DOCUMENTS

| 6,079,993 | A | 6/2000 | Laine | |
|---|---|---|---|---|
| 6,292,980 | B1 * | 9/2001 | Yi et al. | 16/303 |
| 6,692,275 | B2 | 2/2004 | Lee | |
| 6,785,935 | B2 * | 9/2004 | Ahn et al. | 16/221 |
| 6,831,229 | B1 | 12/2004 | Maatta et al. | |
| 2004/0002241 | A1 | 1/2004 | Lee | |
| 2004/0198417 | A1 | 10/2004 | Yoda | |
| 2005/0055807 | A1 | 3/2005 | Maatta et al. | |
| 2006/0096064 | A1 * | 5/2006 | Ma et al. | 16/303 |

FOREIGN PATENT DOCUMENTS

| CN | 1505365 | 6/2004 |
|---|---|---|
| EP | 1432215 | 6/2004 |
| EP | 1510905 | 3/2005 |
| KR | 10-2002-29698 | 4/2002 |

* cited by examiner

*Primary Examiner*—William L. Miller
(74) *Attorney, Agent, or Firm*—Alfred A. Fressola; Ware, Fressola, Van Der Sluys & Adolphson LLP

(57) ABSTRACT

A hinge structure to be used in portable electronic devices, such as mobile stations, making it possible to rotate a first body part (10) and a second body part (20) of the device in relation to an axis of rotation (X-X) of the hinge structure, the hinge structure having a hinge element (31) with a first hinge half and a second hinge half which are movable in relation to each other by a pivot (X) placed on the axis of rotation (X-X), and which hinge element is arranged to be connected by the first hinge half to the first body part (10) and by the second hinge half to the second body part (20). The hinge structure comprises a shield structure (32) for shielding the back of the device, the shield structure being connected to the hinge element (31), and the shield structure (32) being arranged to be movable in the direction perpendicular to the axis of rotation (X-X).

14 Claims, 8 Drawing Sheets

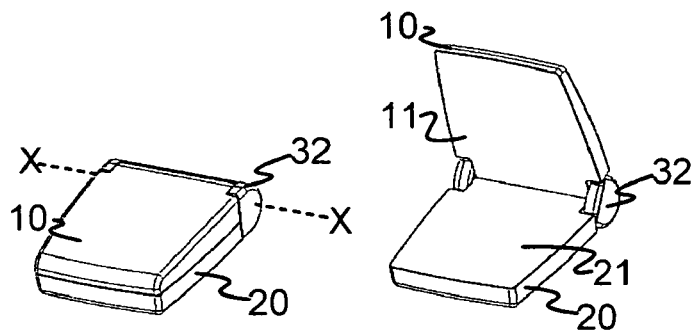
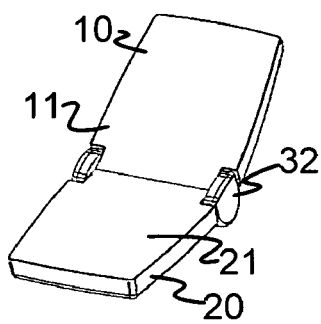
Fig. 6    Fig. 7    Fig. 8
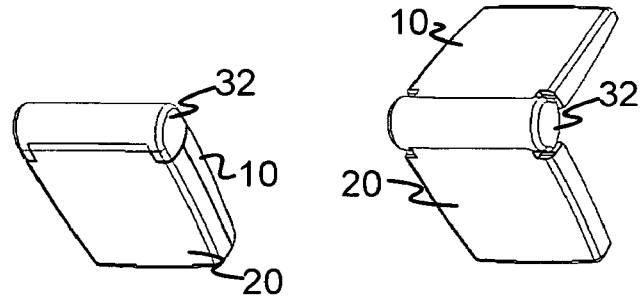
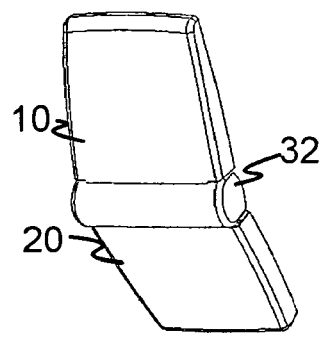
Fig. 9    Fig. 10    Fig. 11

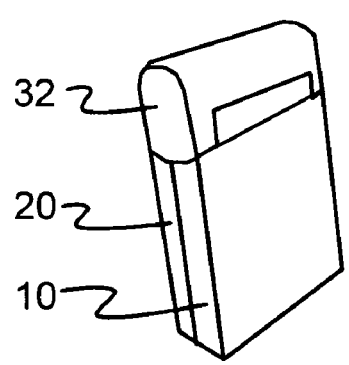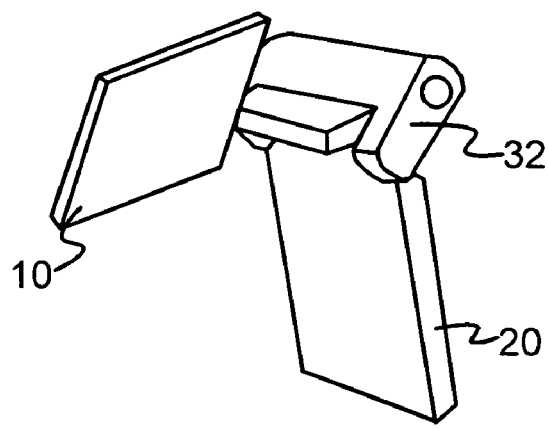
Fig. 22  Fig. 23
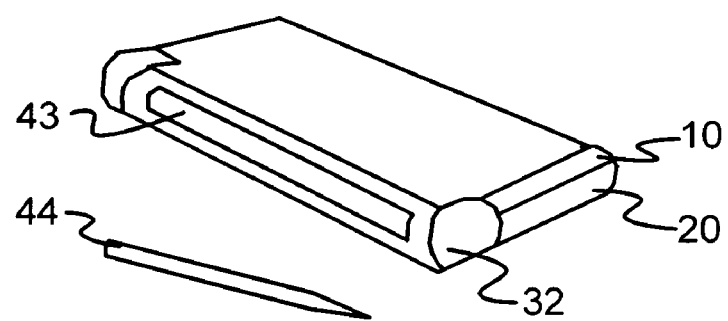
Fig. 24

HINGE STRUCTURE FOR AN ELECTRONIC DEVICE

CROSS-REFERENCE TO RELATED APPLICATIONS

This application claims priority under 35 USC §119 to Finnish Patent Application No. 20055225 filed on May 13, 2005.

FIELD OF THE INVENTION

The invention relates to a hinge structure to be used in portable electronic devices, such as mobile stations. In addition, the invention relates to a method for forming a foldable device.

BACKGROUND OF THE INVENTION

With advances in technology, the size of various compact electronic devices, such as mobile phones, has become smaller. A common way to implement a phone which is small and thereby convenient to carry along but still easy to use, is to make the phone of two parts which are folded when the phone is not used. These so-called fold devices have quickly become common and gained popularity among users particularly because a small portable size and a sufficient usage size are combined in the flip-up structure.

An essential part in the foldable device is its hinge structure. The hinge structure must allow opening and closing of the device in an easy and reliable way. Furthermore, it must be durable in the intended use and generally also make data transmission possible between different parts of the device.

One hinge structure is disclosed in U.S. Pat. No. 6,079,993 presenting a hinge system with two hinge means and the coupling of the body parts with a cable. In particular, this publication presents such a solution for placing the cable that is applicable in portable devices, for example personal digital assistants, which are opened and closed relatively frequently. Such devices are normally used in a less frequent and more device friendly way than mobile phones. For this reason, hinge structures for mobile phones have been developed to be resistant to heavier and more frequent use.

U.S. Pat. No. 6,692,275 B2 presents a hinge structure for a mobile phone, and particularly a solution for placing the wiring through the hinge structure (a flexible printed circuit board). This solution is intended particularly for mobile phones which are opened and closed very often, wherein the hinge structure and the wiring are subjected to frequently repeated loads. The presented hinge structure extends to the whole length of the back, as does the majority of hinge structures in mobile phones. The hinge structure comprises edge parts and a middle part arranged to be pivoted therebetween. The edge parts are connected to the first body part, and the middle part is connected to the second body part. The wiring is arranged to extend from the first body part through the edge part and the middle part of the hinge structure to the second body part. Said publication presents a particular hinge pin structure by which loads on the wiring can be reduced when compared with corresponding hinge arrangements equipped with different hinge pins.

The conventional hinge structures for mobile phones are relatively complex, wherein the assembly of the device requires work stages which increase the costs. Furthermore, the hinge structures extending over the whole back of the device require a lot of space compared to the other structures, wherein the size of the whole device becomes larger due to the hinge structure.

SUMMARY OF THE INVENTION

The present invention discloses a novel hinge arrangement by means of which the space of the housing of a phone can be utilized in a more efficient way.

To attain this purpose, the hinge structure according to the invention is primarily characterized in that it makes it possible to rotate the first body part and the second body part of the device in relation to the axis of rotation of the hinge structure, the hinge structure comprising at least a hinge element which comprises a first hinge half and a second hinge half which are arranged to be movable in relation to each other by means of a pivot placed on the axis of rotation, and which hinge element is arranged to be connected by the first hinge half to the first body part of the device and by the second hinge half to the second body part, wherein the hinge structure comprises a shield structure for shielding the back of the device, the shield structure being connected to the hinge element, and the shield structure being arranged to be movable in a direction perpendicular to the axis of rotation.

The method according to the invention, in turn, is primarily characterized in that it makes it possible to rotate the first body part and the second body part of the device in relation to the axis of rotation of the hinge structure, in which method the first body part is connected to the second body part by a hinge element in such a way that the hinge element is connected by the first hinge half to the first body part of the device and by the second hinge half to the second body part, the hinge halves being arranged to be movable in relation to each other by means of a pivot placed on the axis of rotation, wherein the hinge element is connected to a shield structure for shielding the back of the device, and the shield structure moves in the direction perpendicular to the axis of rotation during the movement of the body parts.

The hinge structure, which makes it possible to pivot the first body part and the second body part of the device in relation to the rotation axis of the hinge structure, comprises at least a hinge element, which hinge element comprises a first hinge half and a second hinge half which are arranged to be movable in relation to each other by means of a pivot on the axis of rotation. The hinge element is arranged to be connected by the first hinge half to the first body part of the device and by the second hinge half to the second body part. According to the basic idea of the invention, the hinge structure comprises a shield structure for protecting the back of the device in the vicinity of the hinge element, the shield structure being connected to the hinge element via a runner and a guide.

In another embodiment of the invention, the hinge structure comprises at least a first and a second hinge element as well as a shield structure for protecting the back of the device between the first and the second hinge element, the shield element being arranged to connect the first hinge element to the second hinge element.

In one embodiment, the hinge structure comprises two hinge elements, one at each end of the back, as close to the edges of the device as possible.

In another embodiment, the shield structure is connected to the pivot of the hinge element via a runner and a guide. In another embodiment, the shield structure is connected to a hinge half of the hinge element via a runner and a guide. In another embodiment, the hinge structure is arranged to be movable in relation to the runner connecting the hinge element to the hinge half. The runners and guides employed can be, for example, various grooves, protrusions, projections and pins.

In one embodiment, in turn, the shield structure is arranged to be movable in a direction perpendicular to the axis of rotation. The shield structure can thus be closer to the rotation axis when the device is in the folded closed position and, in a corresponding manner, the shield cover may be farther away from the rotation axis when the device has been folded out. In one embodiment, the means used for moving the shield structure are runners and guides, wherein the shield structure moves in the direction of the plane perpendicular to the line of axis as the body parts are moving.

The invention makes it possible to provide the hinge structure with various functions and means, such as, for example, an antenna, a display means, a camera, a means for connecting an auxiliary device, a fixing means for fixing the device mechanically, a storage structure, and/or a control means.

The shield structure in the hinge structure protects possible joint structures, such as wires and/or flexible printed circuit boards. Furthermore, the shield structure prevents fingers and pieces of clothing from being trapped between the device.

In some embodiments of the invention, functional units connected to the hinge structure, such as various cameras and exchangeable modules, are possible. The device can thus be made as versatile as possible without making its size too large. The exchangeable modules, in turn, make it possible to assemble the device to meet the needs of the user.

The invention has several advantages to structures of prior art. In one embodiment, the simplicity of the hinge structure reduces the number of components, reduces the costs and facilitates the assembly of the device. The structure is durable, because it has no parts that wear, as such. Moreover, the structure as such does not comprise any moving or loose parts, which also increases the serviceable life. In another embodiment, in turn, clearly more space is left inside the housing, for example, for auxiliary devices.

The solution according to the invention can be used in various devices, such as, for example, portable and hand-held devices. For example, the device can be a mobile phone, a personal digital assistant, a communication device, a camera, and/or a game device. Generally, the invention is well suited for applications in which, at times, the device should be small in size, for example when carried, and at other times, in turn, it should have a relatively large area, for example for controlling functions and/or displaying information. In some embodiments, the foldable structure also forms a shield structure for the means of the device when the device is not opened into the operating position. Thus, for example, the keypad, the display and/or the camera objective can be protected during transportation.

DESCRIPTION OF THE DRAWINGS

In the following, the invention will be described in more detail with reference to the appended skeleton drawings, in which FIGS. 6 to 8 show positions of a device seen from the direction of opening, FIGS. 9 to 11 show positions of a device seen from the direction of the back, FIGS. 22 and 23 illustrate an embodiment comprising a video camera, FIG. 24 shows a solution in which a storage location is integrated in the shield structure of the back.

For the sake of clarity, the figures only show the details necessary for understanding the invention. The structures and details that are not necessary for understanding the invention but are obvious for anyone skilled in the art have been omitted from the figures to emphasize the characteristics of the invention. The figures do not illustrate, for example, the structures relating to the user interface and the data transmission which are, however, part of the structure of a typical mobile station.

DETAILED DESCRIPTION OF THE INVENTION

Figure 1:
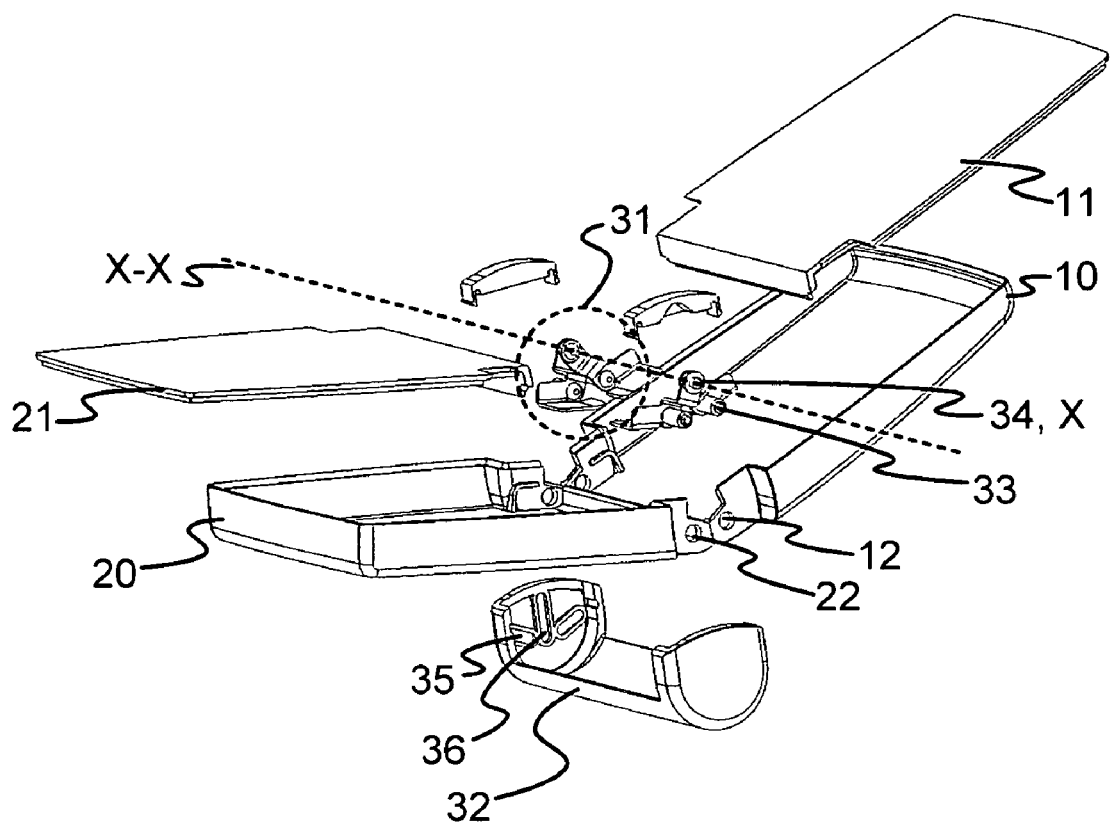
FIG. 1 shows one embodiment of the hinge structure in an exploded view.

FIG. 1 is a so-called exploded view showing one embodiment of the invention. In the figure, the first body part 10 of the device is connected to the second body part 20 of the device with a hinge structure that makes it possible to fold the inner surfaces 11, 21 of the body parts substantially against each other. The inner surfaces 11, 21 may comprise various structures of the device, such as, for example, a keypad, a display, a speaker, a microphone, a control structure, etc.

In the mobile station according to the example, the hinge structure comprises two hinge elements 31 which are placed at each end of the hinged edge of the device, connecting the first body part 10 and the second body part 20. In the device, the pivots X of the hinge element 31 are placed substantially on the same line of axis X-X. This line of axis X-X constitutes the axis of rotation of the device, with respect to which the body parts 10, 20 of the device can be folded. Furthermore, the hinge structure comprises a shield structure 32 for the back. The shield structure 32 is provided to protect the back of the device between the hinge elements 31, and the shield structure is preferably arranged to connect the first hinge element to the second hinge element. In one embodiment, the shield structure 32 for the back is as wide as the hinged side of the device.

The hinge element 31 comprise a first hinge half and a second hinge half which are arranged to be movable in relation to each other by means of a turning point or pivot X. The hinge element 31 are arranged to be connected by the first hinge half to the first body part 10 of the device and by the second hinge half to the second body part 20. The connection can be implemented in a variety of ways. In one embodiment, the same means are used for connecting the hinge element 31 and for connecting and moving the shield structure 32.

In the example shown in FIG. 1, the shield structure 32 is connected by connecting means to the body parts 10, 20 of the mobile station and to the pivots X of the hinge element 31. The hinge structure also comprises means for moving the shield structure 32 in parallel with the plane perpendicular to the line of axis X-X during the movement of the body parts 10, 20. In the example, the moving means and the connecting means are runners 33, 34 and guides 35, 36. In the example, the runners 33, 34 are provided in connection with the hinge element 31, and they have a pin-like shape. The guides 35, 36 in the example, in turn, are grooves provided at the ends of the shield structure 32. Hereinbelow, the runners 33 connected to the body parts 10, 20 will be called body runners 33. The guides 35, in turn, to which the body runners 33 are connected, will be called body guides 35 hereinbelow. For the runner 34 connected to the turning point X of the hinge element 31, the term hinge runner 34 will be used hereinbelow. In a corresponding manner, for the guide 36, to which the hinge runner 34 is connected, the term hinge guide 36 will be used hereinbelow.

In the example assembly, the body runners 33 are arranged to be placed in fixing structures 12, 22 in the body parts 10, 20. In the example, the fixing structures 12, 22 are holes, through which the body runners 33 are placed in the body guides 35.

Figure 2:
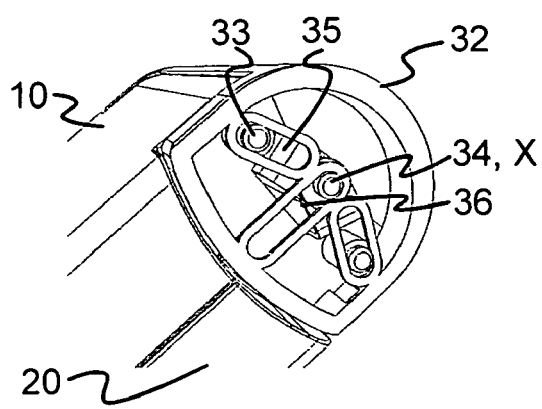
FIGS. 2 to 5 show the operation according to one embodiment of the invention.

The series of FIGS. 2 to 5 illustrates the operation of the above-described embodiment. In the figures, the end of the shield structure 32 for the back has been removed, wherein the guides 35, 36 in the shield structure and the movable runners 33, 34 placed therein are visible. In FIG. 2, the body parts 10, 20 of the device are in the closed position; that is, the body parts are substantially against each other. The body runners 33 are thus placed at the first ends of the body guides 35. In a corresponding manner, the hinge runner 34 is placed at one end of the hinge guide 36. Thus, the shield structure 32 is placed in such a position that it is close to the line of axis X-X. In the example shown in the series of figures, the surfaces 11, 21 of the body parts 10, 20 are, in turn, placed on different sides of the line of axis X-X of the hinge element 31, also at the line of axis.

Figure 3:
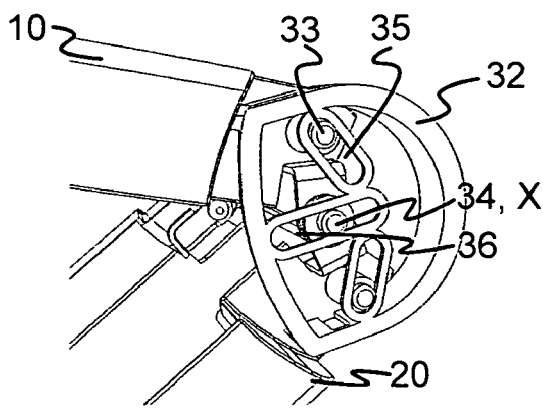
Figure 4:
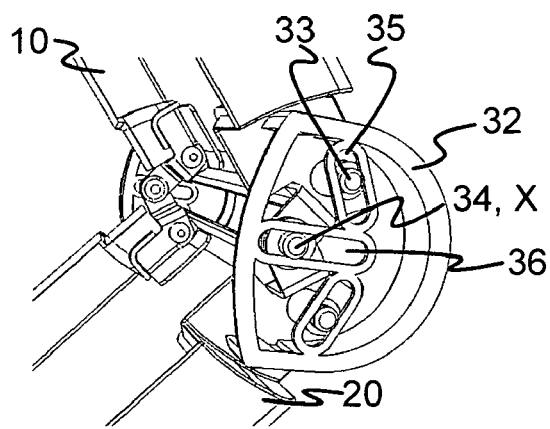

FIGS. 3 and 4 illustrate the change in the relative position of the guides 35, 36 and the runners 33, 34, when the body parts 10, 20 are moved towards the open position. As shown by the figures, the body runner 33 moves towards the second end of the body guide 35. In a corresponding manner, the hinge runner 34 moves towards the first end of the hinge guide 36. Thus, the shield structure 32 is moved farther away from the line of axis X-X as the opening movement proceeds.

Figure 5:
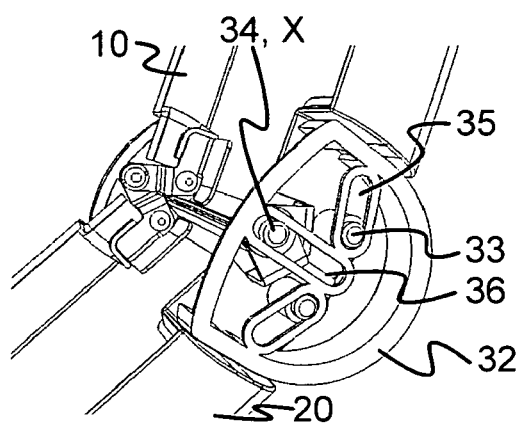

In FIG. 5, the device is in its other extreme position, i.e. open. In the open position, the structures and actuators on the inner surfaces 11, 21 of the device are visible and accessible to the user. In this position, the body runner 33 is at the second end of the body guide 35, and the hinge runner 34 is at the first end of the hinge guide 36. Thus, the shield structure 32 is placed in such a position that it is far away from the line of axis X-X.

The preceding series of FIGS. 2 to 5 only shows some possible positions. There may also be other positions than those presented above, and the placement of the runners 33, 34 and the guides 35, 36 as well as the shield structure 32 may vary according to the embodiment.

The series of FIGS. 6 to 8 and 9 to 11 show the opening of a mobile station equipped with a hinge structure according to the invention. In the first series of figures, the mobile station is seen in the typical direction of operation, and in the second series of figures, from the opposite direction. As shown by FIGS. 7 and 8, the area between the hinge element 31 can be utilized, because the hinge elements are placed in the narrow edge areas only.

FIGS. 9 to 11, in turn, show the efficient function of shielding the back. The angle between the body parts 10, 20 that are opened, i.e. the back, is shielded all the time by the shield structure 32 for the back, wherein anything from the outside, for example the user's fingers or clothes, cannot be trapped unintentionally between the body parts. In particular, element 31 and the shield structure 32 is placed substantially in the centre of the side of the device. As it can be seen from the examples of FIGS. 13, 14 and 15, the hinge element 31 can be placed in several different locations.

Figure 13:
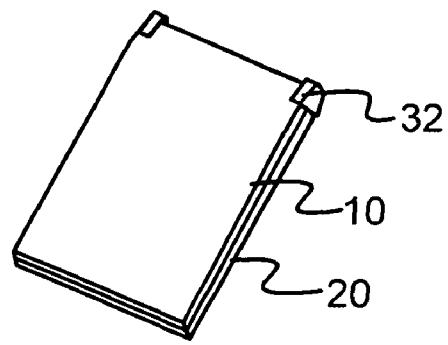
FIG. 13 shows an embodiment with two shield structures.
Figure 14:
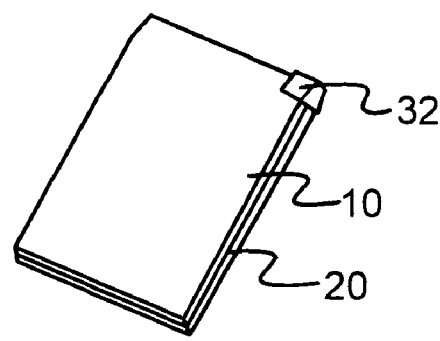
FIG. 14 shows an embodiment with one hinge element.
Figure 15:
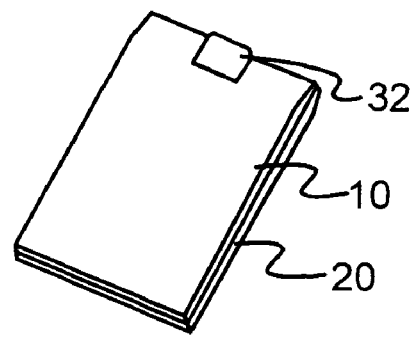
FIG. 15 shows another embodiment with one hinge element.

FIGS. 13, 14 and 15, in turn, show only some examples of how the shield structure 32 is connected to a single hinge element 31 only. In FIG. 13, the body parts 10, 20 of the device are connected to each other by two hinge elements 31. Both hinge elements 31 are connected to the shield structures 32 (the hinge elements are not shown in the figure, because they are covered by the shield structures). The joint between the hinge element 31 and the shield structure 32 can be arranged in the way described in the examples above. The shield structure 32 is arranged to be movable, as in the above examples.

In the example of FIG. 14, the body parts 10, 20 of the device are connected to each other by a single hinge element 31. In this example, the hinge element 31 is connected to the shield structure 32 (the hinge element is not shown in the figure because it is covered by the shield structure). In the example, the shield structure 32 is designed to protect the hinge element 31, but it can also be designed in another way. For example, the shield structure may protect the back of the device on a greater length than the immediate vicinity of the hinge element. Thus, it is possible to provide a shielded space, for example, for the joint structures between the body parts 10, 20.

Figure 25:
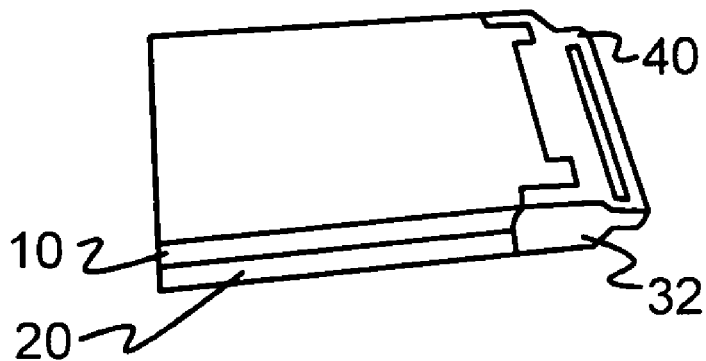
FIGS. 25 and 26 show a solution in which a joystick is integrated in the shield structure of the back.
Figure 26:
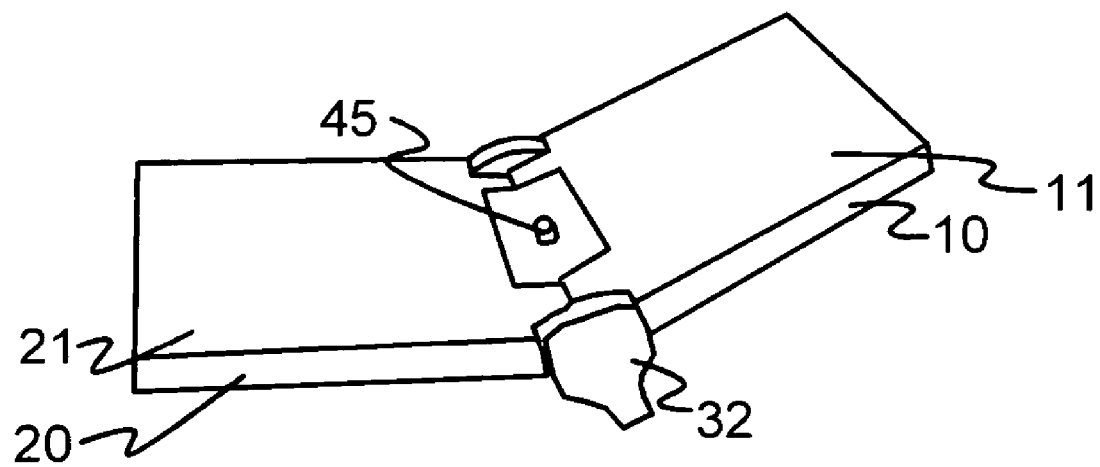

In FIG. 15 as well, the body parts 10, 20 of the device are connected to each other by a single hinge element 31. In this example, the unit formed by the hinge structure 32 of the back. In FIG. 25, the device is shown in the folded closed position, wherein the control structure 45 remains shielded inside the device. FIG. 26 shows the device in the open position, in which the control structure is placed between the body parts 10, 20, accessible to the user. In addition to or instead of the control structure 45, the shield structure may also comprise other structures and means in a corresponding way, for example a camera, a display, a speaker, a microphone, etc. It is also possible to use, as the control structure 45, structures other than the joystick arrangement shown in the example, such as a track ball, a touch panel, etc.

When the shield structure 32 for the back is arranged to be movable, the shield structure can be made rigid, because the shape of the shield structure does not need to change as a result of the movement. Thanks to the stiff structure, the shield structure 32 has a good shielding effect.

In the examples presented above, grooves and pins movable in the grooves were used as the runners 33, 34 and the guides 35, 36, respectively. The grooves and the pins can be designed in a variety of ways, wherein it is possible to affect e.g. the speed of distancing of the shield structure 32 of the back, and on the distance of the movement. Furthermore, the runners 33, 34 and the guides 35, 36 can be placed in a way different from that shown in the example. For example, in some embodiment, it is possible to place the guide 35, 36 in the body part 10, 20 and the runner 33, 34 in the shield structure 32 of the back. It is also possible to design the functional runners 33, 34 and guides 35, 36 in a way different from that shown in the example. The guide 35, 36 can be formed of, for example, a ridge to guide the runner 33, 34. The guide 35, 36 and/or the runner 33, 34 can also be placed in a separate element to which the shield structure 32 is connected. For example, the guides 35, 36 can be provided in a separate link plate, wherein the shield structure 32 does not necessarily need to be coupled directly to the runners 33, 34. Said separate part, in turn, connects the shield structure indirectly to the hinge element 31. There may also be several separate parts. By using a separate part, it is possible in some embodiments to increase the durability of the structure, when the part can be made of a first (for example, stronger) material and the shield structure can be made of a second (for example, more elastic) material.

The above-presented hinge structure makes it possible to implement the device in a variety of ways. In the following, some examples will be presented of applications utilizing the hinge structure.

Figure 16:
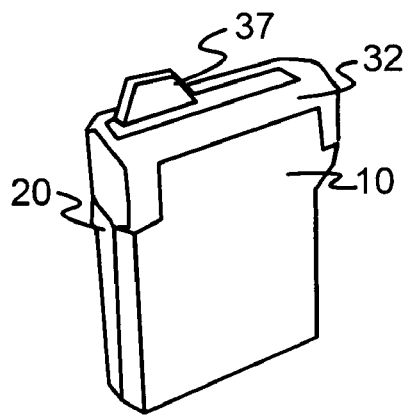
FIG. 16 shows a solution in which an antenna is integrated in the shield structure of the back.

In one embodiment, an antenna structure 37 for the device is connected to the shield structure 32 of the back of the hinge structure, as seen in FIG. 16.

Figure 17:
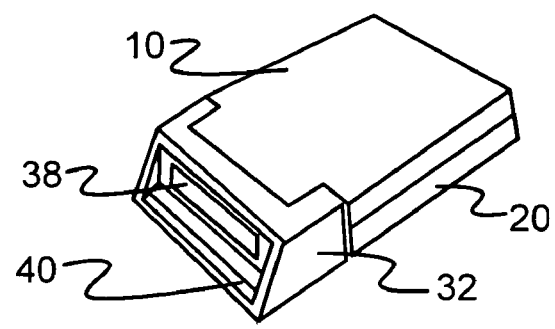
FIGS. 17 to 19 show a solution in which a display and a fixing loop are integrated in the shield structure of the back.
Figure 18:
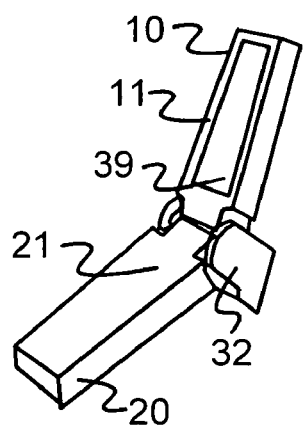
Figure 19:
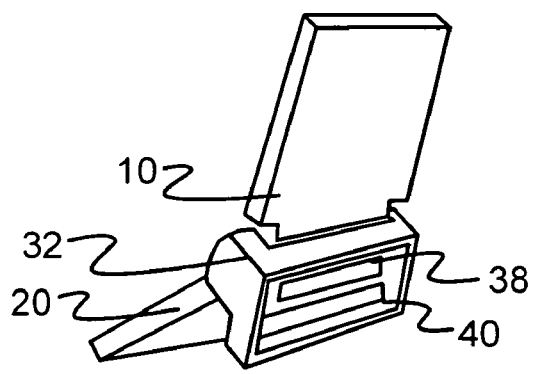

In another embodiment shown in FIGS. 17 to 19, in turn, a display 38 is provided in the shield structure 32 of the hinge. In this embodiment, it is a second display 38 of the device, which is smaller than the first display 39. Said second display 38 is used as an auxiliary display, and it is visible to the user e.g. when the device is folded. Furthermore, in the embodiment shown in FIGS. 17 to 19, a loop 40 is formed in connection with the shield structure 32, to make it possible to suspend the device and to fix it in a variety of ways for different situations of use.

Figure 20:
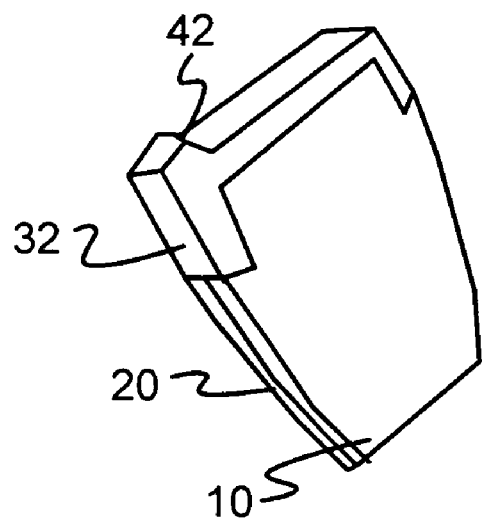
FIGS. 20 and 21 show a solution in which a socket for an exchangeable module is integrated in the shield structure of the back.
Figure 21:
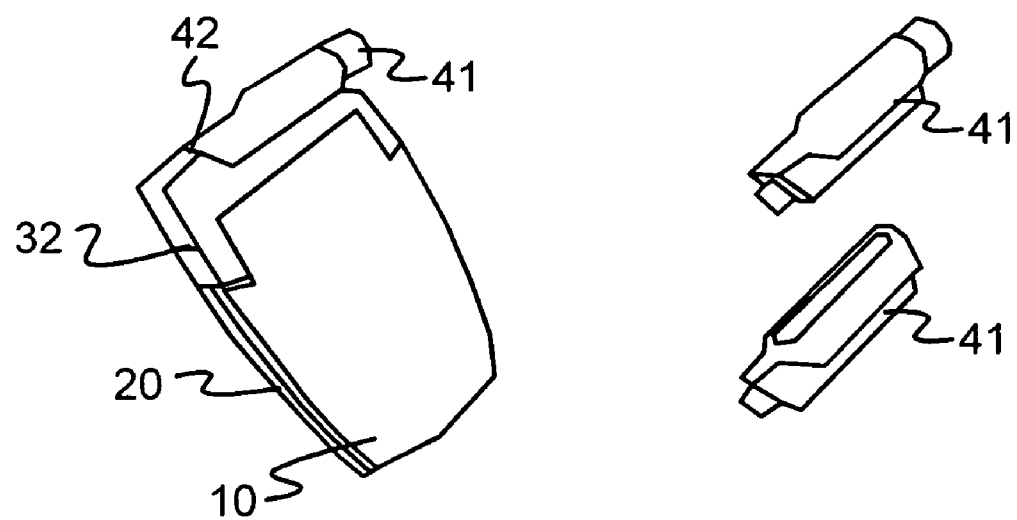

FIGS. 20 and 21, in turn, show an embodiment comprising an exchangeable part or parts 41, and a socket 42 for it. The socket 42 is arranged in the shield structure 32 of the hinge structure. In FIG. 20, no part is placed in the socket 42. In FIG. 21, a part 41, such as a camera module, is placed in the socket 42. The part 41 can be connected by means of various interfaces and joint structures according to each application. For example, the connection can be provided by means of a joint structure of the USB (Universal Serial Bus) type. The parts 41 to be connected may comprise a variety of modules including a camera module, a radio module, a data entry module, a game module, a memory module, etc.

In one embodiment, a video camera is connected to the hinge structure, as is shown in FIGS. 22 and 23. The figures also show the body part 10 arranged to be pivoted. Thus, the user can place the display in the body part 10 in a position which is advantageous in use.

FIG. 24, in turn, shows one embodiment of the invention comprising a storage location 43 for a loose or detachable means 44. In the example, this means is a pen 44, such as a stylus for operating a touch screen. A storage location 43 for said pen 44 is provided in the shield structure 32 of the hinge structure. This storage location 43 may also comprise control means for detecting the placement of the pen 44 in relation to the storage location 43. On the basis of this information, it is possible to control the device in some applications. It is also possible to provide a storage location 43 for other means, such as a pen, a laser pointer, a memory unit, medicine, or for another purpose.

Figure 12:
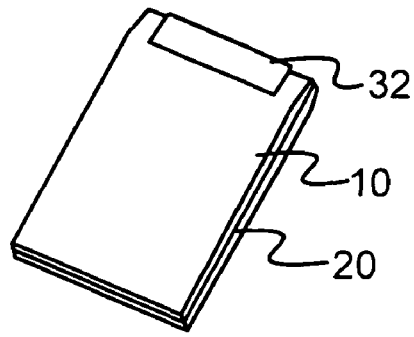
FIG. 12 shows a solution in which the back of the device is wider than the shield structure.

As said above, the hinge structure according to the invention makes it possible to use the hinge area in an efficient way. FIGS. 25 and 26 show one application in which a control structure 45 for the device, such as a joystick in the example, is provided in the area between the hinge element 31. This control structure is integrated in the shield the electrical connecting means between the bodies 10 and 20 are shielded. The shield structure 32 can also be placed between the hinge element 31 in a way different from that described above. For example, FIG. 12 shows a shield structure 32 which is narrower than the back of the device.

As can be seen from the preceding examples, various functions and means can be connected to the hinge structure. They can be placed, for example, on the outer surface of the back, as shown in FIGS. 16 to 24, wherein they are advantageously always accessible. They can also be placed in the hinge structure in such a way that they are placed inside the device, for example as shown in FIGS. 25 and 26, wherein they are shielded e.g. during transport and storage. Furthermore, different arrangements can be combined, wherein the hinge structure may comprise various functions and means, of which some are placed on the outer surface of the back and some inside the device.

By combining, in various ways, the modes and structures disclosed in connection with the different embodiments of the invention presented above, it is possible to produce various embodiments of the invention in accordance with the spirit of the invention. Therefore, the above-presented examples must not be interpreted as restrictive to the invention, but the embodiments of the invention may be freely varied within the scope of the inventive features presented in the claims hereinbelow.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A hinge structure comprising: at least a hinge element which comprises a first hinge half and a second hinge half which are configured to be movable in relation to each other by a pivot placed on an axis of rotation of the hinge structure, and the hinge element is configured to be connected by the first hinge half to a first body part of a portable electronic device and by the second hinge half to a second body part of said device, wherein said body parts of said device are not directly connected to each other, and wherein the hinge structure comprises a shield structure configured to shield a back of the device, the shield structure configured to be movably connected to the hinge element, and the shield structure configured to be movable in a direction perpendicular to the axis of rotation of the hinge structure, wherein said hinge element is located on said device along said axis of rotation, between and spaced from the edges of the device.

2. The hinge structure according to claim 1, wherein the shield structure is connected to the pivot of the hinge element by a runner and a guide.

3. The hinge structure according to claim 1, wherein the shield structure is connected to each hinge half of the hinge element by a runner and a guide.

4. The hinge structure according to claim 3, wherein the shield structure is configured to be movable in relation to the runner connecting the hinge element to the hinge halves.

5. The hinge structure according to claim 1, wherein said at least a hinge element comprises a first hinge element and a second hinge element, the shield structure configured to shield the back of the device between the hinge elements and being configured to connect the first hinge element to the second hinge element.

6. The hinge structure according to claim 1, wherein the shield structure comprises at least one of the following:
   an antenna,
   a display,
   a camera,
   a connector for connecting an auxiliary device,
   a fixing mechanism for mechanical fixing of the device,
   a storage structure, and
   a controller.

7. The electronic device according to claim 1, wherein the portable electronic device is one of the following: a mobile phone, a personal digital assistant, a communication device, a camera, a game device.

8. A hinge apparatus comprising:
   at least one hinge element which comprises a first hinge half and a second hinge half,
   a pivot placed on an axis of rotation in cooperative engagement with said first hinge half and said second hinge half and configured to provide that said first hinge half and said second hinge half are movable in relation to each other,
   wherein the first hinge half is configured to connect to a first body part of a portable electronic device,
   wherein the second hinge half is configured to connect to a second body part of said device;
   wherein said first body part of the device and said second body part of the device are not directly connected to each other, and wherein said first body part and said second body part are configured to rotate about said axis of rotation, and
   a shield structure configured to shield a back of said device, said shield structure movably connected to said at least one hinge element and configured to be movable in a direction perpendicular to said axis of rotation,
   wherein said at least one hinge element is located on said device along said axis of rotation, between and spaced from the edges of the device.

9. The apparatus of claim 8, wherein the hinge shield structure is connected to said pivot by a runner and a guide.

10. The hinge apparatus according to claim 8, wherein the shield structure is connected to each hinge half of the hinge element by a runner and a guide.

11. The hinge apparatus according to claim 10, wherein the shield structure is configured to be movable in relation to the runner connecting the hinge element to the hinge halves.

12. The apparatus of claim 8, wherein the hinge shield structure comprises at least one of the following:
    an antenna,
    a display,
    a camera,
    a connector for connecting an auxiliary device,
    a fixing mechanism for mechanical fixing of the device,
    a storage structure, and
    a controller.

13. A method of forming a foldable device comprising:
    connecting a first body part of the device to a second body part of the device by a hinge element in such a way that the first body part of the device and the second body part of the device are not directly connected to each other, but the hinge element is connected by a first hinge half to the first body part of the device and by a second hinge half to the second body part,
    arranging the hinge halves to be movable in relation to each other by a pivot placed on an axis of rotation and of the hinge element,
    movably connecting a shield structure to the hinge element for shielding the back of the device, wherein the shield structure is movable in a direction perpendicular to the axis of rotation during the movement of the body parts, and locating said hinge element on said device at any point along said axis of rotation, between and spaced from the edges of the device.

14. The method according to claim 13, wherein said hinge element comprises a first hinge element and a second hinge element wherein the first body part is connected to the second body part by the first hinge element and the second hinge element, and the first hinge element is connected to the second hinge element by the shield structure to shield the back of the device between the hinge elements.

* * * * *